No. 791,196. Patented May 30, 1905.

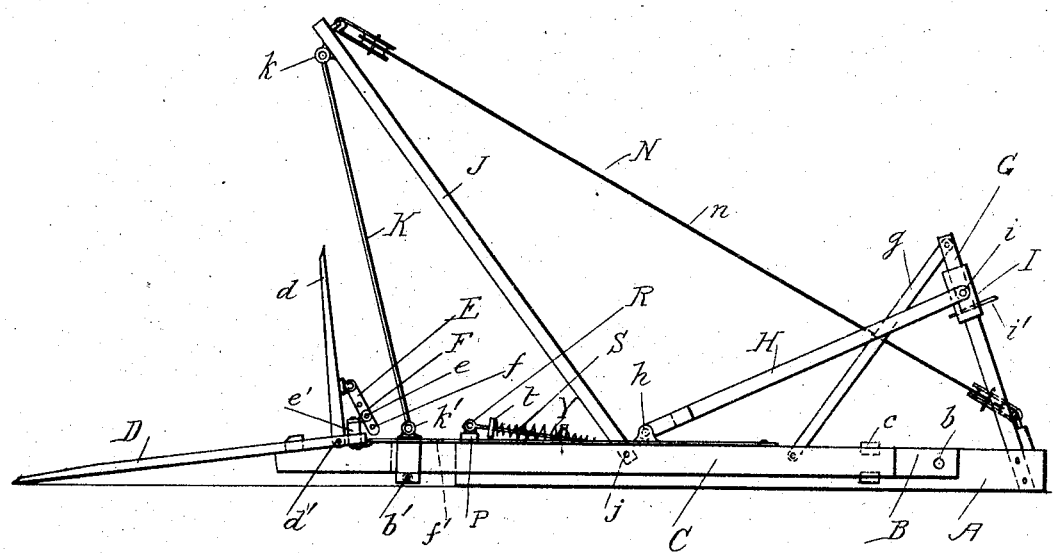

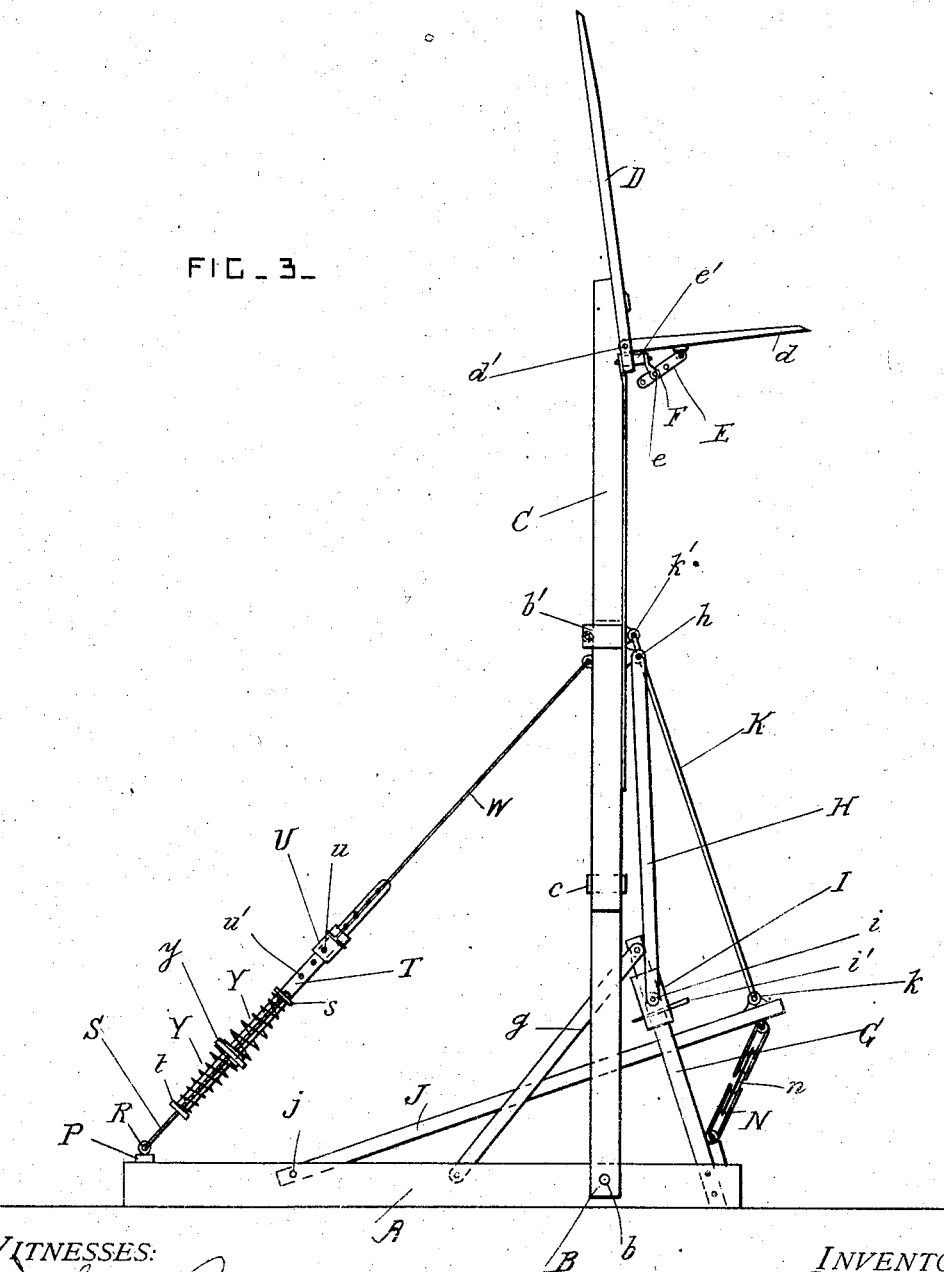

UNITED STATES PATENT OFFICE.

MARION R. JENKINS AND RALPH J. SPARKS, OF BROWNING, MISSOURI; SAID SPARKS ASSIGNOR TO SAID JENKINS.

HAY LOADER AND STACKER.

SPECIFICATION forming part of Letters Patent No. 791,196, dated May 30, 1905.

Application filed September 12, 1904. Serial No. 224,165.

*To all whom it may concern:*

Be it known that we, MARION R. JENKINS and RALPH J. SPARKS, residing at Browning, in the county of Linn and State of Missouri, have invented certain new and useful Improvements in Hay Loaders and Stackers; and we do hereby declare the following to be a full, clear, and exact description of the invention, such as will enable others skilled in the art to which it appertains to make and use the same.

This invention relates to loaders and stackers for hay or other similar substances; and it consists in the novel construction and combination of the parts hereinafter fully described and claimed.

In the drawings, Figure 1 is a side view of the loader, showing it lowered. Fig. 2 is a plan view of the loader. Fig. 3 is a side view of the loader, showing it raised.

A is a frame or base which rests on the ground, but which may be mounted upon wheels, if desired.

B represents two side bars, which are pivoted to the frame A by pivots $b$.

C represents extension side bars which are slidable against the side bars B. The side bars B have guides $b'$ at their free ends, in which the bars C are slidable, and the said bars C have guides $c$ at one end, which are slidable over the side bars B.

D is a fork-head which is secured to the outer ends of the extension side bars C. This fork-head is formed of a series of long teeth arranged in line with the side bars and a series of short teeth $d$, which are pivoted to the inner end portions of the long teeth by pins $d'$ and arranged at substantially a right angle to the said long teeth. The position of the short teeth with respect to the long teeth is adjusted by means of links E, which are pivotally connected with the short teeth at one end. These links have a series of holes and are slidable in eyes $e$ on the cross-bar $e'$, which forms a part of the fork-head and which is secured to the long teeth. F represents pins which pass through the said eyes and through the holes $f$ in the said links, so that the short teeth may be set at various angles.

A cross-bar $f'$ extends between the free end portions of the side bars B and holds them parallel with each other.

G represents fulcrum-bars which project upwardly from one end of the frame A, and $g$ represents braces which are connected to the said fulcrum-bars and the frame A, so that the fulcrum-bars are rigidly secured in position.

H represents radius-bars. These bars are pivoted at one end to pins $h$, which are secured to the middle parts of the extension side bars C. The other ends of the radius-bars H are pivoted to pins $i$, which project from shoes I, which are slidable upon the fulcrum-bars G. Pins $i'$ are provided for engaging with the said shoes and with any of a series of holes in the fulcrum-bars, so that the positions of the said shoes may be adjusted.

J represents inclined arms the lower end portions of which are pivoted to the frame A by pins $j$. K represents rods the upper ends of which are pivoted to the upper ends of the said arms J by a pin connection $k$. The lower end portions of the said rods K are pivotally connected with the side bars C, being preferably pivoted to eyes $k'$, which project from the guides $b'$.

N is a hoisting-tackle of any approved construction provided with a hoisting-rope $n$ and secured between the upper end of the arms J and the frame A at a point between the fulcrum-bars G.

A cross-bar P extends under the arms J at the end portion of the frame A, and a spring-stop mechanism is arranged between this cross-bar and the free end portions of the side bars B.

R is an eye which projects from the middle part of the cross-bar P. S represents two rods which are pivoted to the said eye at one end and which have a guide-plate $s$ at their free ends.

T is a flat bar which is slidable in the guide-plate $s$ between the two rods S and which has a guide-plate $t$ at one end, which is slidable upon the said rods.

U is a socket which is slidable upon the bar T, and $u$ is a pin by means of which the said socket is connected to the said bar T at different points, the said bar being provided with a series of holes $u'$ for the pin $u$ to engage with. W represents flexible connections, such as cords, secured to the said socket U and to the free end portions of the side bars B.

A spring or springs is arranged between the guide-plates $s$ and $t$. Two conical spiral springs Y are preferably provided. The smaller ends of these springs are arranged to bear against the said guide-plates, and the larger ends of the said springs bear against a guide-plate $y$, which is slidable over the rods S and bar T. The end convolutions of the springs engage with projections on the guide-plate $y$, so that the springs are held in good shape and do not become distorted.

In stacking hay the hay is placed on the fork when the machine is in the position shown in Fig. 1, and the rope of the hoisting-tackle is pulled upon by means of a horse or in any other suitable manner. The machine is thereby moved to the position shown in Fig. 3, and the hay is tossed off the short teeth, which are set to the most advantageous angle for delivering it. The extension side bars C slide upon the main side bars B as the fork is raised with the load, so that the strain of lifting is not so great at the start as it would be if slidable extension-bars were not used. As the haystack increases in height the extension side bars are caused to slide farther along the side bars B by changing the positions of the fulcrum-shoes upon the fulcrum-bars G. This arrangement of parts enables the work of making the stack to be lessened when the stack is first started, and it is not necessary to raise the hay as high as when the stack is nearing completion. When the fork arrives at its delivery-point, the springs Y of the stop mechanism prevent the rake-head from being pulled over too far and jerk the fork-head backward, so that it descends by gravity to its former position, as shown in Fig. 1, directly the hay is discharged from the fork onto the top of the stack. The adjustability of the socket U of the stop mechanism enables the stop mechanism to be adjusted very quickly, so that it may be used to the best possible advantage.

What we claim is—

1. The combination, with a frame, fulcrum-bars which project above the frame, and side bars pivoted to the said frame; of a fork-head and slidable extension side bars carried by the said side bars, radius-bars pivoted at one end to the said extension side bars, means for pivotally connecting the other ends of the said radius-bars to the said fulcrum-bars at various points of their length, and means for raising the said side bars and fork-head.

2. The combination, with a frame, fulcrum-bars which project upwardly from the frame, and side bars pivoted to the said frame; of extension side bars slidable on the said side bars, a fork-head carried by the said extension side bars, shoes slidable on the said fulcrum-bars, means for securing the said shoes in various positions, radius-bars pivoted to the said shoes and to the said extension side bars, and means for raising the said side bars and fork-head.

3. The combination, with a frame, side bars pivoted to the frame, and a fork-head carried by the said side bars; of a longitudinally-slidable spring-pressed stop-bar pivotally connected at one end with the said frame, flexible connections between the other end of the said stop-bar and the said side bars, and means for raising the said side bars and fork-head.

4. The combination, with a frame, side bars pivoted to the said frame, and a fork-head carried by the said side bars; of a spring-pressed bar pivotally connected with the said frame, adjustable connections between the said bar and the said side bars, and means for raising the said side bars and fork-head.

5. The combination, with a frame, side bars pivoted to the said frame, and a fork-head carried by the said side bars; of rods pivoted to the said frame and provided with a guide-plate, a bar slidable in the said guide-plate and provided with a guide-plate which slides on the said rods, flexible connections between the said bar and the said side bars, two conical spiral springs arranged with their smaller ends against the said guide-plates, and a guide-plate which engages with the adjacent and larger end portions of the said springs.

6. The combination, with a frame, side bars pivoted to the said frame, and a fork-head carried by the said side bars; of a spring-pressed bar pivotally connected with the said frame and provided with a series of holes, a socket adjustable longitudinally on the said bar and provided with a pin for engaging with the said holes, flexible connections between the said socket and the said side bars, and means for raising the said side bars and fork-head.

In testimony whereof we affix our signatures in presence of two witnesses.

MARION R. JENKINS.
RALPH J. SPARKS.

Witnesses:
C. E. MURPHY,
JAS. P. BALLING.